US009406238B2

(12) United States Patent
Smith

(10) Patent No.: US 9,406,238 B2
(45) Date of Patent: Aug. 2, 2016

(54) AVIATION WEATHER AND PERFORMANCE OPTIMIZATION SYSTEM AND METHOD

(71) Applicant: THE BOEING COMPANY, Chicago, IL (US)

(72) Inventor: Brian James Smith, Peyton, CO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/540,498

(22) Filed: Nov. 13, 2014

(65) Prior Publication Data

US 2016/0140853 A1 May 19, 2016

(51) Int. Cl.
*G08G 5/00* (2006.01)
*G06F 19/00* (2011.01)

(52) U.S. Cl.
CPC ............ *G08G 5/0091* (2013.01); *G08G 5/0021* (2013.01); *G08G 5/0039* (2013.01)

(58) Field of Classification Search
CPC .. G08G 5/0091; G08G 5/0021; G08G 5/0039
USPC ................. 701/415, 3, 14, 120; 340/990, 945
See application file for complete search history.

(56) References Cited

U.S. PATENT DOCUMENTS

| | | | | |
|---|---|---|---|---|
| 5,612,882 | A * | 3/1997 | LeFebvre | G01C 21/3453 340/990 |
| 5,999,882 | A * | 12/1999 | Simpson | G06Q 10/047 702/3 |
| 6,289,277 | B1 * | 9/2001 | Feyereisen | G01C 21/005 340/945 |
| 7,129,857 | B1 | 10/2006 | Spirkovska | |
| 7,877,197 | B2 | 1/2011 | Lewis et al. | |
| 8,050,864 | B2 | 11/2011 | Schilke et al. | |
| 8,600,588 | B2 * | 12/2013 | Del Amo Blanco | G08G 5/0034 701/14 |
| 8,666,649 | B2 | 3/2014 | Otto et al. | |
| 8,674,850 | B2 | 3/2014 | Zimmer et al. | |
| 8,725,330 | B2 | 5/2014 | Failing | |
| 8,862,287 | B1 | 10/2014 | Clark et al. | |
| 2007/0138347 | A1 * | 6/2007 | Ehlers | G01C 21/3461 246/1 R |
| 2009/0171560 | A1 | 7/2009 | McFerran et al. | |
| 2009/0204453 | A1 | 8/2009 | Cooper et al. | |
| 2011/0054718 | A1 * | 3/2011 | Bailey | G01W 1/08 701/3 |
| 2012/0147030 | A1 | 6/2012 | Hankers et al. | |
| 2012/0232785 | A1 | 9/2012 | Wiesemann et al. | |

* cited by examiner

*Primary Examiner* — Tan Q Nguyen
(74) *Attorney, Agent, or Firm* — Patterson + Sheridan, LLP

(57) ABSTRACT

According to an embodiment, a method can include receiving an initial travel plan. The method can also include receiving weather information related to the travel plan. The weather information can include at least one of current weather conditions and predicted weather conditions. The method can also include analyzing one or more phases of the travel plan with respect to the received weather information to generate weather factor scores for the one or more phases of the travel plan. The method can also include determining a total weather factor score for the travel plan based on the weather factor scores for the one or more phases of the travel plan. The total weather factor score quantifies an expected effect of the at least one of current weather and predicted conditions on the travel plan. The method can also include displaying the total weather factor score.

22 Claims, 5 Drawing Sheets

300

FLIGHT PHASE - TAKE OFF

| | | 320 | 322 | 324 | 326 | 328 |
|---|---|---|---|---|---|---|
| 302 | AIR TEMPERATURE(C) | -40 TO -20 | -19 TO 0 | 1 TO 20 | 20 TO 30 | 30 TO 40 |
| | FACTOR | 0 | 0 | 0 | 0.2 | 0.4 |
| 304 | VISIBILITY (MILES) | 0 | 0.1 | 0.5 | 1 | 10 |
| | FACTOR | 1 | 0.8 | 0.6 | 0.2 | 0 |
| 306 | CLOUD CEILING (FEET AGL) | 0 | 300 | 500 | 1,000 | 10,000 |
| | FACTOR | 1 | .8 | .6 | .1 | 0 |
| 308 | GROUND WIND SPEED (KTS) | 0 TO 5 | 5 TO 10 | 10 TO 15 | 15 TO 20 | 20+ |
| | FACTOR | 0 | 0.2 | 0.4 | 0.8 | 1 |
| 310 | GROUND WIND DIRECTION | 0 | <15 DEG | 15 TO 30 | 30 TO 45 | 45 TO 90 |
| | FACTOR | 0 | 0.2 | 0.4 | 0.7 | 1 |
| 312 | PRECIPITATION | NONE | MIST | DRIZZLE | STEADY | HEAVY |
| | FACTOR | 0 | 0.1 | 0.3 | 0.5 | 0.6 |
| 314 | ICING | NONE | LIGHT | MEDIUM | HEAVY | |
| | FACTOR | 0 | 0.2 | 0.6 | 1 | |
| 316 | LIGHTNING | NONE | DISTANT | NEAR | | |
| | FACTOR | 0 | 0.2 | 0.6 | | |

FIG. 3A

FIG. 3B

AIR TEMPERATURE = 0

VISIBILITY = 0.6

CLOUD CEILING = 0.6

GROUND WIND SPEED = 0

GROUND WIND DIRECTION = 0

PRECIPITATION = 0.1

ICING = 0

LIGHTING = 0

FIG. 4A

| | | |
|---|---|---|
| TAKE OFF | = | 3.2 |
| CLIMB | = | 2.8 |
| CRUISE | = | 1.1 |
| APPROACH | = | 1.3 |
| LANDING | = | 2.0 |

FIG. 4B

| | | |
|---|---|---|
| TAKE OFF | = | 2.0 |
| CLIMB | = | 2.2 |
| CRUISE | = | 1.1 |
| APPROACH | = | 1.4 |
| LANDING | = | 2.0 |

AVIATION WEATHER AND PERFORMANCE OPTIMIZATION SYSTEM AND METHOD

BACKGROUND

Aspects described herein relate to providing quantitative information related to weather information that can affect a travel plan and providing alternative travel plans in view of the weather information.

SUMMARY

According to various embodiments, a method can include receiving an initial travel plan. The method can also include receiving weather information related to the travel plan. The weather information can include at least one of current weather conditions and predicted weather conditions. The method can also include analyzing one or more phases of the travel plan with respect to the received weather information to generate weather factor scores for the one or more phases of the travel plan. The method can also include determining a total weather factor score for the travel plan based on the weather factor scores for the one or more phases of the travel plan. The total weather factor score quantifies an expected effect of the at least one of current weather and predicted conditions on the travel plan. The method can also include displaying the total weather factor score.

According to various embodiments, a system can include a memory and a computer processor. The memory can be configured to store an initial travel plan that. The memory can also be configured to store weather information related to the travel plan. The weather information can include at least one of current weather conditions and predicted weather conditions. The processor can be configured to analyze one or more phases of the travel plan with respect to the received weather information to generate weather factor scores for the phases of the travel plan. The processor can further be configured to determine a total weather factor score for the travel plan based on the weather factor scores for the phases of the travel plan. The total weather factor score quantifies an expected effect of the at least one of current weather and predicted conditions on the travel plan. The processor can also be configured to output the total weather factor score.

According to various aspects, a computer program product for identifying weather factors of a travel plan can include a computer readable storage medium having computer readable program code embodied therewith. The computer readable program code can be executable by one or more computer processors to receive an initial travel plan. The computer readable program code can further be executable to receive weather information related to the travel plan. The weather information can include at least one of current weather conditions and predicted weather conditions. The computer readable program code can also be executable to analyze one or more phases of the travel plan with respect to the received weather information to generate weather factor scores for the one or more phases of the travel plan. The computer readable program code can also be executable to determine a total weather factor score for the travel plan based on the weather factor scores for the one or more phases of the travel plan. The total weather factor score quantifies an expected effect of the at least one of current weather and predicted conditions on the travel plan. The computer readable program code can further be executable to output the total weather factor score.

BRIEF DESCRIPTION OF THE SEVERAL VIEWS OF THE DRAWINGS

FIG. 3A is an exemplary table of weather factors that can be applied to an aircraft during a takeoff phase of the travel plan under various conditions;

FIG. 3B is an exemplary set of weather factors for a takeoff phase of an aircraft based on weather conditions;

FIG. 4A is an exemplary set of weather factor scores for different phases of flight for an initial travel plan that can be used to calculate a total weather factor score; and FIG. 4B is an exemplary set of weather factor scores for different phases of flight after the initial travel plan has been modified.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In many instances, vehicle operators must consider weather conditions when deciding when to travel, where to travel, etc. Weather conditions may delay a trip and/or make travel less safe, for example. However, weather information is not provided in a manner that allows for quantitative analysis of weather conditions and their effect on a travel plan. For example, pilots have access to a great deal of weather information. However, it is left to the pilots (and/or dispatchers) to assimilate the many bits of weather information and make a subjective determination as to whether the weather conditions are acceptable for flying. In various aspects described herein, weather information can be assimilated and weather factors can be quantified in a manner that enables objective evaluation of a travel plan.

Figure 1:
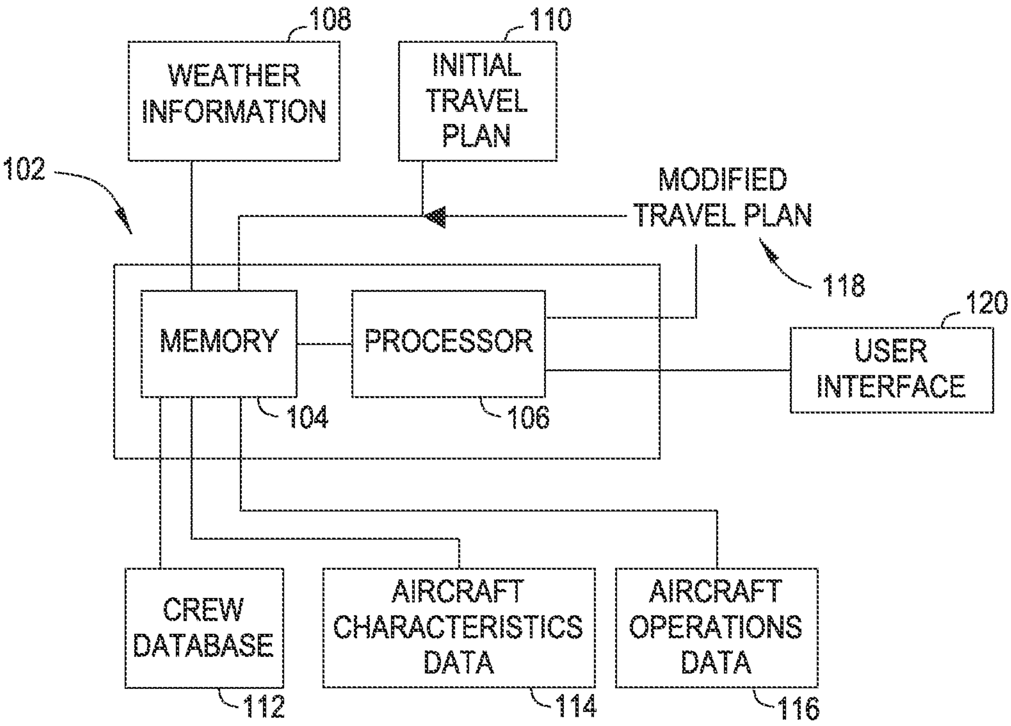
FIG. 1 is a block diagram of a system for determining a weather factor score for an aircraft according to various aspects.

FIG. 1 illustrates a system 100 that can be used to output a quantifiable weather factor score for a travel plan. The system 100 can include a computer 102 that includes memory 104 and a processor 106. The computer 102 can be located on board a vehicle and/or a planning office (e.g., a flight scheduling office), for example. For example, a first computer 102 located in a scheduling office for an airline may perform an initial analysis, described below, to determine a weather factor score for a travel plan. A second computer 102 located on board an aircraft may provide subsequent analyses, described below, to update the weather factor score during execution of the travel plan (i.e., during a flight). In various instances, the first computer 102 could provide the subsequent analysis and transmit updated weather scores and alternate flight plans to the aircraft when the aircraft is in flight. The memory 104 can receive and store information from a variety of sources. For example, the memory 104 can be in communication with various weather information 108 sources. The weather information 108 can include any and all sources of weather information. For example, the sources of weather information can include next-generation radar (NEXRAD), Doppler radar, satellite data, METARS, notices to airmen (NOTAMs), terminal area forecasts (TAFs), pilot reports (PIREPS), binary universal form for the representation of meteorological data (BUFRs), and general regularly-distributed information in binary form (GRIB2) data. In flight, the source of weather information could also include weather data being collected by the aircraft e.g., air temperature and winds aloft) as well as data being collected in transmitted by other aircraft. The memory 104 can also store the initial travel plan 110 for a particular flight. The memory 104 can also store a crew database 112. The crew database 112 can include a list of vehicle operators who may be available to perform a particular travel operation along with detailed information about the vehicle operators (e.g., experience level). The memory 104 can also store a vehicle characteristics database 114. For an aircraft, the vehicle characteristics database 114 can include an aircraft stability model, information about aircraft aerodynamic performance, and/or aircraft capabilities (e.g., auto land capabilities, instrument landing system approach capabilities, and the like). The memory 104 can also store vehicle operations data (e.g., for an aircraft, flight operational quality assurance (FOQA) data with actual flight results and fuel burn data).

Figure 2A:
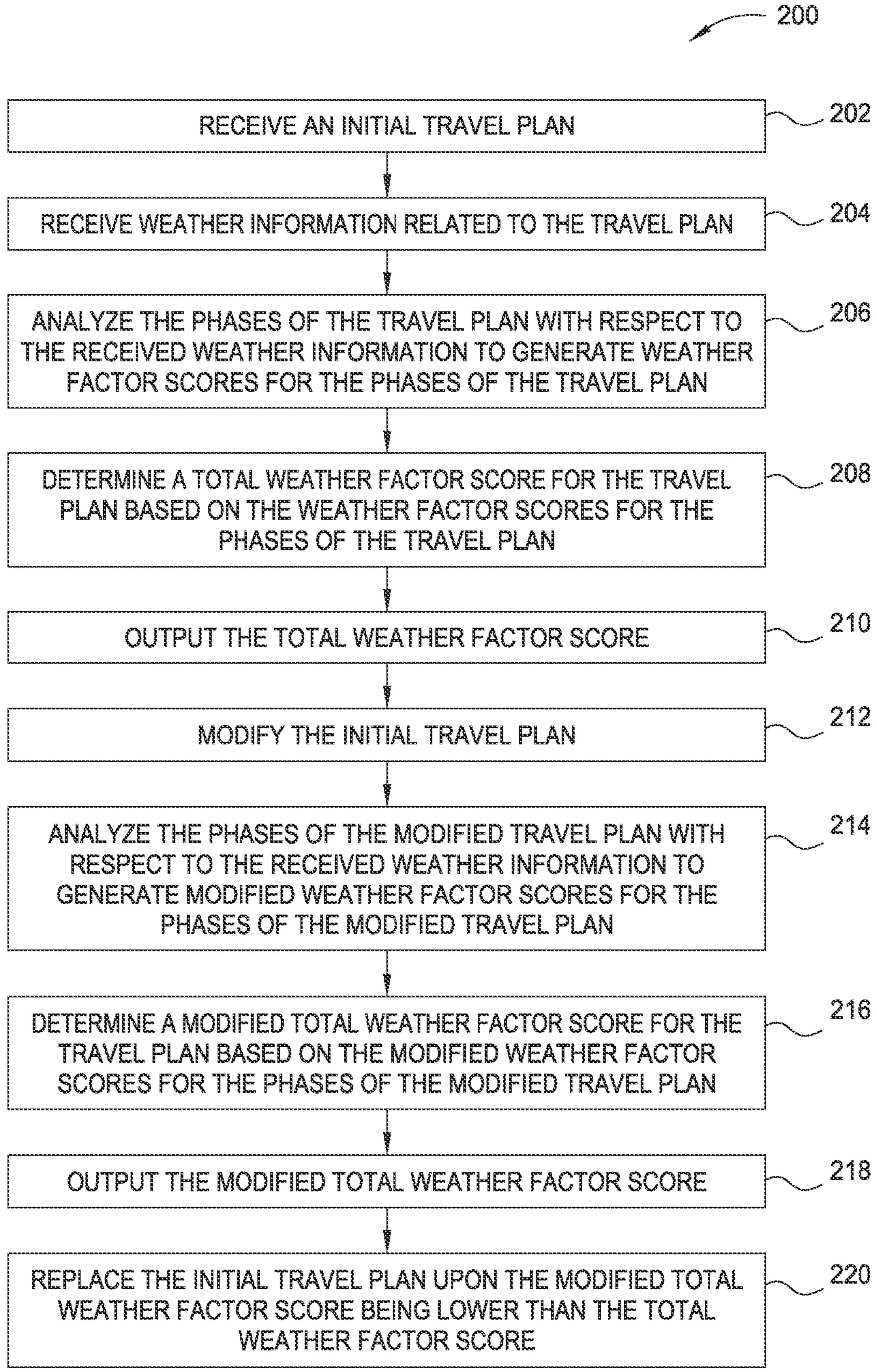
FIG. 2A is a block diagram of a method for providing a weather factor score for a travel plan and for modifying the travel plan to achieve a different weather factor score.

FIG. 2A illustrates an exemplary method 200 that can be used to calculate a weather factor score for a particular travel plan. In block 202, an initial travel plan can be received. In the example of a flight of an aircraft, the initial travel plan (e.g., initial travel plan 110) can include a departure airport, a destination airport, and a sequence of waypoints from the departure airport to the destination airport. The initial travel plan can also include expected cruise altitude, cruise speed, top of climb, top of descent, and fuel load. The travel plan can be separated into one or more phases. For the flight of the aircraft, the travel plan may include a takeoff phase, a climb phase, a cruise phase, a descent phase, and a landing phase. In block 204, weather information related to the travel plan can be received. For example, continuing the example of the flight of the aircraft, weather information along the travel route as well as weather information for regions extending 50 miles away from the route could be received. The weather information could also include weather information for the alternate airports that may be listed in the flight plan. In block 206, each of the phases of the travel plan can be analyzed with respect to the received weather information to generate weather factor scores. For the flights of the aircraft, a first weather factor score could be generated for the takeoff phase, a second weather factor score can be generated for the climb phase, a third weather factor score could be generated for the cruise phase, the fourth weather factor score could be generated for the descent phase, and a fifth weather factor score can be generated for the landing phase. In block 208, after the weather factor scores for the different phases of the travel plan have been generated, a total weather factor score can be calculated. In various instances, the total weather factor score could be a sum of the weather factor scores for the different phases. In various instances, the total weather factor score could be an average or a weighted average of the weather factor scores for the different phases. In block 210, the total weather factor score can be output. For example, referring again to FIG. 1, the system 100 may include a user interface 120, such as the display screen. The total weather factor score could be output for display on such a display screen.

In various scenarios, the total weather factor score for the travel plan may be unsatisfactory and/or undesirable (e.g., the total weather factor score could be above a threshold value). In such instances, the method 200 may analyze alternative travel plans that could reduce or change the total weather factor score and/or the weather factor score for one or more of the phases of the travel plan. In block 212, one or more modifications to the travel plan may be made. In various instances, a user (e.g., a dispatcher or a pilot) may set constraints on what modifications are allowed. For example, a first constraint may require that the departure airport for a flight remains the same. Another exemplary constraint may require that the destination airport remains the same. Another exemplary constraint may require that the departure time cannot vary from the departure time in the initial travel plan by more than four hours. Another exemplary constraint may require that routes over conflict zones or war zones cannot be considered. Another exemplary constraint may only allow unscheduled crew members and/or unscheduled vehicle to be considered as alternates to the crew and vehicle identified in the initial travel plan. After the initial travel plan has been modified, in block 214, the modified travel plan can be analyzed with respect to the received weather information to generate modified weather factor scores for the phases of the modified travel plan. In block 216, a modified total weather factor score can be determined based on the modified weather factor scores for the phases of the modified travel plan. In various instances, blocks 212, 214, and 216 can be repeated to identify different modified total weather factor scores for different modifications to the initial travel plan. In block 218, the modified total weather factor score can be output. In various instances, the method 200 may only output the best modified total weather factor score amongst several modified travel plans considered. In various other instances, the method 200 may output all of the modified total weather factor scores so that the user can see all options. In various instances, the weather factor scores and the modified weather factor scores for the different phases of the travel plans can also be output.

In various instances, after being presented with one or more modified total weather factor scores, the user may be able to select one of the modified travel plans. At such time, the initial travel plan would be replaced with the selected modified travel plan. In various other instances, the method 200, in block 220, can automatically replace the initial travel plan upon the modified total weather factor score being more favorable than the total weather factor score for the initial traffic plan.

Figure 2B:
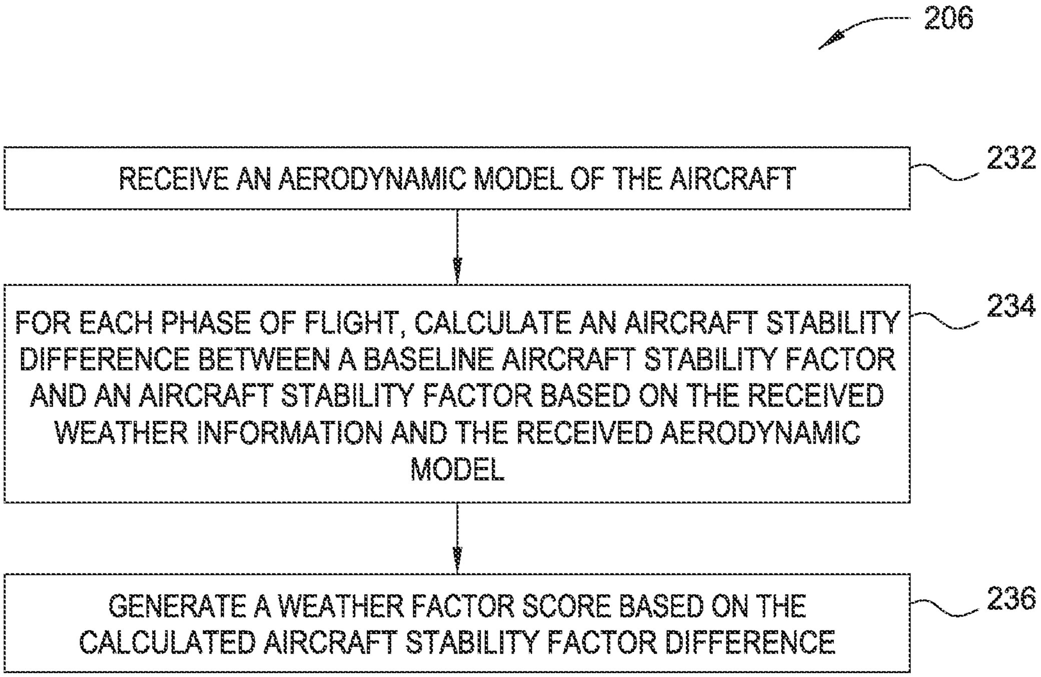
FIG. 2B is a block diagram of a method for analyzing phases of the travel plan with respect to receive weather information to generate weather factor scores.

FIG. 2B illustrates in greater detail steps for performing block 206 (and block 214) of the method 200. In block 232, an aerodynamic model of the aircraft can be received. Referring again to FIG. 1, the memory 104 can receive aircraft characteristics data 114 that can include such an aerodynamic model. In block 234, for each phase of flight, the method 200 can calculate an aircraft stability difference between a baseline aircraft stability factor and an aircraft stability factor based on the received weather information and the received aerodynamic model. For example, a baseline aircraft stability factor may be based on standard atmospheric conditions for the phase of flight. An aircraft stability factor based on the received weather information can be based on deviations from standard atmospheric conditions. In block 236, the weather factor score can be generated based on the calculated aircraft stability factor difference.

FIG. 3A illustrates a table 300 of various weather conditions 302-316 that may affect vehicle stability of a particular model of aircraft during a takeoff phase. The table 300 also shows various weather factors for the different weather conditions based on varying levels of severity of the different weather conditions. For example, referring to air temperature (row 302), a first column 320 shows an air temperature range of between −40° C. and −20° C. and an associated weather factor of zero. Similarly a second column 322 and a third column 324 for air temperatures between −19° C. and 0° C. and 1° C. and 20° C., respectively, also have associated weather factors of zero. As the air temperature continues to rise, the air temperature may become a significant factor (e.g., higher air temperatures can reduce engine power and increase the length of runway needed to take off). Accordingly, in the exemplary table 300, a fourth column 326 for air temperatures between 20° C. and 30° C. has an associated weather factor of 0.2. Furthermore, a fifth column 328 for air temperatures between 30° C. and 40° C. has an associated weather factor of 0.4. Other weather conditions can have different weather factors associated with them. For example, the weather factor associated with the visibility 304 weather condition get smaller as visibility improves. Similarly, the weather factor associated with the cloud ceiling 306 weather condition decreases as the cloud ceiling increases.

As discussed above, the various weather factors in the table 300 can be based on calculated changes to aircraft stability based on the weather conditions. Referring again to FIG. 1, aircraft operations data 116 can be provided and stored in the computer memory 104. The aircraft operations data 116 can be used to analyze past flights and adjust the weather factors. For example, analysis of aircraft operations data 116 may reveal, over time, that the weather factor for medium icing (shown in row 314 and column 324 of the table 300) should be a 0.7 instead of a 0.6. Additionally, the weather factors for the various weather conditions may vary depending on whether combinations of weather conditions are simultaneously present. For example, in table 300, a weather factor for steady precipitation (in row 312 and column 326) is 0.5. However, that weather factor for steady precipitation may increase to 0.6 if the cloud ceiling is 500 feet or less, for example.

In various instances, the various weather factor scores in table 300 could be region dependent. For example, the weather scores for various levels of visibility for a takeoff phase or landing phase may be higher at a highly congested airport than at a small airport with little traffic. Similarly, the weather factor for various levels of cloud ceiling for a takeoff phase or landing phase may be higher at an airport near mountainous terrain than at an airport surrounded by relatively flat land.

In many instances, the determination of weather factors will be predictive. Put differently, the analysis in block 206 of the method 200 is performed before a flight is performed. As a result, weather information pertaining to the time of the flight will be predicted and not known with certainty. In such instances, a weather factor could be determined based on probability. As an example, consider the precipitation (row 312) weather condition. Suppose that in an exemplary scenario there is a 50% chance of mist (with a weather factor of 0.1 as indicated in column 322), a 10% chance of no precipitation (with a weather factor of zero as indicated in column 320), and a 40% chance of steady rain (with a weather factor of 0.5 as indicated in column 326). A weather factor for precipitation could be calculated based on a probability weighting of the weather factors as indicated by Equation (1), below, resulting in a weather factor of 0.25.

$$(50\%)(0.1)+(10\%)(0.0)+(40\%)(0.5)=0.05+0+0.2=0.25 \quad (1).$$

In various instances, the weather factors can be calculated from the aerodynamic model for the aircraft. For example, a cross wind of five knots may result in a 1% reduction in aircraft stability and a cross wind of ten knots may result in a 2% reduction in aircraft stability. As a result, a weather factor for a five knot cross wind could be 1 and a weather factor for a ten knot cross wind could be 2.

FIG. 3B illustrates an exemplary set of determined weather factors for a scenario of weather conditions for the takeoff phase of a flight plan for an aircraft. In this scenario, there is a relatively low cloud ceiling of 500 feet (weather factor of 0.6), visibility is limited to a half-mile (weather factor of 0.6), and there is mist precipitation (weather factor of 0.1). In various instances, the different weather factors can be added to generate a weather factor for the takeoff phase of flight. For example, the three above identified weather factors can be added to a weather factor score for the takeoff phase of 1.3. In various other instances, the various weather factors could be averaged. For example, the weather factor score of 1.3 could be divided by the total number of weather conditions possible (in this example, eight), resulting in a weather factor score for the takeoff phase of 0.16. In various other instances, the various factors could be averaged using a weighting system. For example, icing and air temperature may be considered to be more important weather conditions than the remaining weather conditions. As a result, a weighting factor may be applied to the weather factors for the icing and air temperature weather conditions such that those weather factors more heavily influence the weather factor for the phase of the travel plan (takeoff phase).

FIG. 4A illustrates an exemplary set of weather factor scores for five phases of a flight plan. The takeoff phase includes a weather factor score of 3.2, the climb phase includes a weather factor score of 2.8, the cruise phase includes a weather factor score of 1.1, the approach phase has the weather factor score of 1.3, and the landing phase has a weather factor score of 2.0. In various instances, the weather factor scores for the various phases could be added together to determine a total weather factor score for the flight plan. For example, the above-mentioned five weather factor scores sum to a total weather factor score of 10.4. In various other instances, the weather factor scores for the various phases could be averaged together, resulting in a total weather factor score of 2.1. In various other instances, the weather factor scores for the various phases could be averaged using a weighting system. For example, the takeoff phase and the landing phase are often the most critical during a flight for safety reasons. Thus, the weather factor scores for the takeoff phase and the landing phase may be doubled, for example, for averaging purposes. If the weather factor scores for the takeoff phase and landing phase are doubled, then such a weighted average total weather factor score would be 3.1.

As discussed above, in various instances, modifications to the initial travel plan can be considered (e.g., block 212 of method 200) to reduce the total weather factor score or the weather factor score for a particular phase of the travel plan. For example, delaying the departure time of a flight by an hour may allow the storm system to pass, visibility to improve, etc. Similarly, changing the route traveled by an aircraft in flight may avoid a storm system. Modifications to the initial travel plan could also include possible changes to the equipment used to perform the travel plan and/or the crew operating the equipment. For example, a different aircraft than the originally-planned aircraft may be better equipped to fly in forecast weather conditions. As an example, a different aircraft may have a higher crosswind landing capability, different avionics, or the like. Also, various crewmembers may have more experience with certain types of weather conditions than the crew that is initially assigned to the flight. For example, if a strong crosswind is predicted at the arrival airport when the aircraft is scheduled to arrive, then a highly experienced crew may be a better choice (and have a lower weather factor score) then a relatively inexperienced crew. In various instances, constraints may be placed on the allowable modifications to the initial travel plan. For example, a constraint may require that the origin airport and destination airport remained the same. As another example, a constraint may require that the departure time for a flight varies by no more than four hours from the departure time in the initial travel plan. As another example, a constraint may prohibit a route that crosses over a conflict zone (e.g., a war zone). As another example, a constraint may prohibit swapping to aircraft and/or crew who are already scheduled for another flight operation.

FIG. 4B illustrates an exemplary set of weather factors for the five phases of the flight plan shown in FIG. 4A after the flight plan has been modified. For example, the modified flight plan may delay takeoff by an hour to allow a storm system to pass by the departure airport. However, under the modified flight plan, the aircraft would have to fly through the storm system on its approach to the destination airport. The modified flight plan has reduced the weather factor for the takeoff phase from 3.2 to 2.0 and the weather factor for the climb phase from 2.8 to 2.2. The weather factors for the cruise phase and the landing phase remain the same at 1.1 and 2.0, respectively. The weather factor for the approach phase has increased slightly from 1.3 to 1.4. The resulting total weather factor score is equal to 8.7, a reduction from 10.4 for the initial flight plan shown in FIG. 4A. As discussed above, in various instances, the takeoff and landing phases of the flights may be the most critical. Thus, the modified flight plan may be acceptable because the weather factor score for the takeoff phase has decreased and the weather factor score for the landing phase has not increased. The slight increase in the weather factor score for the approach phase may be acceptable because it is a less critical phase of flight and because the slight increase is offset by a large decrease in the weather factor score during the takeoff phase. In various other scenarios, such trade-offs may not be acceptable. For example, a modified travel plan may result in a significant decrease to the weather factor score for the climb phase but also results in an increase to the weather factor scores for the takeoff phase and/or the landing phase of the travel plan. Such a trade-off may be deemed unacceptable where the takeoff phase and the landing phase are the most critical.

In various instances, the weather information can also be used to estimate a fuel burn for a travel plan and changes in estimated fuel burn for modifications to the travel plan. For example for a flight of an aircraft, the aircraft characteristics data (e.g., aircraft characteristics data 114) can include an aircraft fuel performance model that estimates fuel consumption based on, among other things, weather conditions. The actual and/or predicted weather conditions for a flight plan can be input into the aircraft fuel performance model for the phases of flight, and the estimated fuel consumption for the different phases of flight can be added to determine a total fuel consumption for the flight. In the event a modification to the flight plan is made (as discussed above), then the estimated fuel consumptions for the modified phases of the flight plan can be calculated, and a modified total fuel consumption for the flight can be calculated as well. In various instances, such a fuel calculation can be used to identify a more fuel-efficient route for a given total weather factor score. The travel plan can be modified to attempt to identify alternative travel plans that results in the same or a lower weather score while also reducing fuel usage. In various instances, an increase in the total weather score may be acceptable as a trade-off for lower fuel consumption.

Referring again to FIG. 1, the computer 102 may be located in a dispatch office, a planning room, or the like. For example, a dispatcher for a commercial airline may calculate a total weather factor score for an initial flight plan and may explore modified flight plans as described above with reference to FIG. 2. The total weather factor score may be transmitted from the computer 102 in the dispatcher's office to a computer onboard the aircraft. For example, the weather factor score may be transmitted to a personal computer device (e.g., an iPad or other computer tablet) controlled by the pilot via Wi-Fi, cellular data connection, or the like. As another example, the weather factor score may be transmitted to an avionics computer (e.g., a flight management computer) onboard the aircraft via an aircraft communications addressing and reporting system (ACARS), very high frequency (VHF) radio, or the like. During flight, the computer 102 in the dispatcher's office may communicate with the computer(s) onboard the aircraft to provide updated weather factor scores as the flight progresses. For example, for a flight from Los Angeles to New York City, the weather conditions may change significantly while the aircraft is in the air, resulting in changes to the total weather factor score and/or to weather factor scores for various phases of the flight. In various instances, computers onboard the aircraft can also perform the functions of the computer 102 in FIG. 1. In such instances, the computers onboard the aircraft can update the total weather factor score and/or the weather factor scores for the phases of the flight plan as the flight progresses.

In various instances, operations data can be collected after a flight has concluded to update aspects of weather factors for various flight conditions. For example, FOQA data can be collected from an aircraft and be used to determine actual aircraft stability effects from weather conditions that were present during the flight. Such actual aircraft stability effects can be used to adjust the weather factors for the different weather conditions. For example, referring again to FIG. 3A, the analysis of actual aircraft stability effects from weather conditions may indicate that the weather factor for light icing for the particular aircraft model should be a 0.3 instead of a 0.2. The table 300 could then be updated accordingly.

Additionally, the FOQA data (and other data) could be used to validate, rank, or otherwise rank different weather products. As described above, data from many different weather products can be used to generate weather factor scores. Analysis of the FOQA data may reveal that certain weather products are more accurate (with respect to predicting effects on aircraft stability) than others. Such analysis could be used to provide a ranking for certain weather products over others. For example, two different weather products may forecast icing (among other weather conditions). Through analysis of FOQA data, the first product may be determined to be significantly more accurate than the second weather product for icing. As a result, the first weather product may include a weighting ranking of 10 (on a scale of 10 to 1, with 10 being the best) and the second weather product may include a weighting factor of 5. If the first weather product predicts light icing and the second weather product predicts medium icing, then the ranking factors may result in a predicted icing condition of "light" because of the higher ranking. However, if the first weather product is not available for some reason and the second weather product is available, then the predicted icing condition could be set to "medium" based on the prediction from the available second weather product.

In certain instances, aspects described herein may incorporate non-weather factors when calculating weather scores. For example, as described above, a total weather factor score for a flight plan may include weather factor scores for takeoff, climb, cruise, descent, and landing phases. Furthermore, as described above, an analysis of alternative flight plans can consider such variables as changes to the departure time to try to improve the weather factor score for a particular phase or the total weather factor score. However, varying parameters of the flight plan to reduce a weather factor score may affect non-weather aspects of the flight plan. As an example, delaying takeoff by an hour may allow a storm to pass the departure airport. However, the delay may result in the aircraft arriving at the destination airport during a high-congestion period instead of arriving during a low-congestion period if the aircraft is not delayed. A table of factors for the landing phase could include an airport congestion factor for the landing phase to capture any "cost" associated with landing during the high-congestion period. Put differently, if the table for the landing phase does not account for the increased congestion, then delaying the flight by an hour to wait for the weather to pass by may appear to have little or no downside (aside from the schedule delay). However, including a congestion factor in the landing phase table may increase the weather factor score for the landing phase if takeoff is delayed. Depending on the circumstances, the increased landing phase weather factor score may outweigh the reduced takeoff phase score.

In various instances, the above-mentioned congestion factor score could be included in a category that is separate from the phases of the flight plan. For example, a total weather factor score could incorporate weather factor scores from a takeoff phase, a climb phase, a cruise phase, a descent phase, a landing phase, and a "miscellaneous phase." The congestion factor could be included in the "miscellaneous phase." The "miscellaneous phase" could also incorporate other factors, such as a factor that accounts for disruptions to an overall schedule. For example, consider two different flights for an airline: a first flight from Denver, Colo. to Chicago, Ill., and a second flight from Chicago, Ill. to Toledo, Ohio. The first flight in this example is critical to the airline schedule because many passengers will be connecting to another flight in Chicago. As a result, even small delays could result in large disruptions to the airline's overall schedule. The second flight is less critical because Toledo is generally a destination for passengers rather than a connection. As a result, certain delays may have a minimal effect on the airline's overall schedule. The "miscellaneous phase" could include a schedule factor that is flight dependent. For example, for the first flight from Denver to Chicago, a delay of fifteen minutes or less could have a schedule factor of 0.1, a delay of thirty minutes or less could have a schedule factor of 0.4, a delay of an hour or less could have a schedule factor of 0.7, and any delay over an hour could have a schedule factor of 1.0. By contrast, for the flight from Chicago to Toledo, any delay of less than an hour could have a schedule factor of 0.1 and any delay over an hour could have a schedule factor of 0.3. By incorporating such schedule factors in the "miscellaneous phase," schedule disruption costs associated with delaying a flight to improve other aspects of the total weather factor score or weather factor score for certain phases can be captured.

The various aspects described herein can be used in other applications besides aircraft. For example, similar systems and methods could be used for trains, trucks, cars, and the like. For example, drivers often use their smart phones to calculate a driving route and to provide turn by turn directions. Such smart phones are also usually capable of receiving weather data from one or more sources. An application running on the user smart phone may calculate a weather factor score for a requested route. The application may also suggest modifications to the route that would result in a different weather factor score. Similarly, smart phones can provide walking directions to pedestrians. Again, an application running on the smart phone may calculate a weather factor score for a requested walking route and suggest modifications to the route that would result in a different weather factor score.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects described herein may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., applications for calculating a weather factor score for a travel plan) or related data available in the cloud. For example, an application for determining a weather factor score for a travel plan and for modifying the travel plan to change the weather factor score could execute on a computing system in the cloud and output the weather factor score and modified travel plan to a local computer (e.g., a computer of a dispatcher for an airline). In such a case, the application could determine a weather factor score (and whether factor scores for different phases of the travel plan) and store the weather factor scores at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:

receiving an initial travel plan;

receiving weather information related to the travel plan, wherein the weather information includes at least one of current weather conditions and predicted weather conditions;

analyzing one or more phases of the travel plan with respect to the received weather information to generate weather factor scores for each of the one or more phases of the travel plan;

determining a total weather factor score for the travel plan based on the weather factor scores for the one or more phases of the travel plan, wherein the total weather factor score quantifies an expected effect of the at least one of current weather conditions and predicted conditions on the travel plan; and displaying the total weather factor score.

2. The method of claim 1, further comprising:

performing at least one modification to the initial travel plan;

analyzing the one or more phases of the modified travel plan with respect to the received weather information to generate modified weather factor scores for the one or more phases of the modified travel plan;

determining a modified total weather factor score for the modified travel plan based on the weather factor scores for the one or more phases of the modified travel plan; and displaying the modified total weather factor score.

3. The method of claim 2, further comprising replacing the initial travel plan with the modified travel plan upon the modified total weather factor score being more favorable than the total weather factor score.

4. The method of claim 2, further comprising receiving at least one constraint, and wherein performing at least one modification to the initial travel plan comprises limiting modifications to the initial travel plan based on the at least one constraint.

5. The method of claim 1, wherein the travel plan comprises a flight plan for an aircraft.

6. The method of claim 5, wherein analyzing the one or more phases of the travel plan with respect to the received weather information to generate weather factor scores for the phases of the travel plan comprises:

receiving an aerodynamic model of the aircraft;

for the one or more phases of the flight plan, calculating an aircraft stability difference between a baseline aircraft stability and an aircraft stability based on the received weather information and the received aerodynamic model; and generating a weather factor score based on the calculated aircraft stability difference.

7. The method of claim 1, further comprising:

during execution of the travel plan:

receiving updated weather information related to remaining one or more phases of the travel plan;

analyzing the remaining one or more phases of the travel plan with respect to the received updated weather information to generate updated weather factor scores for the remaining one or more phases of the travel plan;

determining an updated total weather factor score for the travel plan based on the updated weather factor scores for the remaining one or more phases of the travel plan; and displaying the updated total weather factor score.

8. The method of claim 7, further comprising:

performing at least one modification to the travel plan;

analyzing the modified travel plan with respect to the received weather information to generate modified weather factor scores for the modified travel plan;

determining a modified total weather factor score for the remaining phases of the modified travel plan based on the weather factor scores for the phases of the modified travel plan; and displaying the modified total weather factor score.

9. A system, comprising:

memory configured to store:

an initial travel plan; and weather information related to the travel plan, wherein the weather information includes at least one of current weather conditions and predicted weather conditions; and a processor configured to:

analyze one or more phases of the travel plan with respect to the weather information to generate weather factor scores for the one or more phases of the travel plan;

determine a total weather factor score for the travel plan based on the weather factor scores for the one or more phases of the travel plan, wherein the total weather factor score quantifies an expected effect of the at least one of current weather and predicted conditions on the travel plan; and output the total weather factor score.

10. The system of claim 9, wherein the processor is further configured to:

perform at least one modification to the initial travel plan;

analyze the one or more phases of the modified travel plan with respect to the weather information to generate modified weather factor scores for the one or more phases of the modified travel plan;

determine a modified total weather factor score for the modified travel plan based on the weather factor scores for the one or more phases of the modified travel plan; and output the modified total weather factor score.

11. The system of claim 10, wherein the processor is further configured to replace the initial travel plan with the modified travel plan upon the modified total weather factor score being more favorable than the total weather factor score.

12. The system of claim 10, wherein the memory is further configured to store at least one constraint; and wherein the processor limits the at least one modification based on the at least one constraint.

13. The system of claim 10, wherein the travel plan comprises a flight plan of an aircraft, wherein the memory is further configured to store an aerodynamic model of the aircraft; and wherein the processor is configured to analyze the one or more phases of the modified travel plan with respect to the weather information to generate modified weather factor scores for the phases of the modified travel plan by:

for each phase of the flight plan, calculating an aircraft stability difference between a baseline aircraft stability and an aircraft stability based on the weather information and the stored aerodynamic model; and generating a weather factor score based on the calculated aircraft stability difference.

14. The system of claim 9, wherein the processor is further configured to, during execution of the travel plan:

receive updated weather information related to remaining one or more phases of the travel plan;

analyze the remaining one or more phases of the travel plan with respect to the received updated weather information to generate updated weather factor scores for the remaining one or more phases of the travel plan;

determine an updated total weather factor score for the travel plan based on the updated weather factor scores for the remaining one or more phases of the travel plan; and output the updated total weather factor score.

15. They system of claim 14, wherein the processor is further configured to:

perform at least one modification to the travel plan;

analyze the modified travel plan with respect to the received weather information to generate modified weather factor scores for the modified travel plan;

determine a modified total weather factor score for the remaining phases of the modified travel plan based on the weather factor scores for the phases of the modified travel plan; and output the modified total weather factor score.

16. A computer program product for identifying weather factors for a travel plan, the computer program product comprising:

a computer-readable storage medium having computer-readable program code embodied therewith, the computer-readable program code executable by one or more computer processors to:

receive an initial travel plan;

receive weather information related to the travel plan, wherein the weather information includes at least one of current weather conditions and predicted weather conditions;

analyze one or more phases of the travel plan with respect to the received weather information to generate weather factor scores for the one or more phases of the travel plan;

determine a total weather factor score for the travel plan based on the weather factor scores for the one or more phases of the travel plan, wherein the total weather factor score quantifies an expected effect of the at least one of current weather and predicted conditions on the travel plan; and output the total weather factor score.

17. The computer program product of claim 16, wherein the computer-readable program code is further executable to:

perform at least one modification to the initial travel plan;

analyze the one or more phases of the modified travel plan with respect to the received weather information to generate modified weather factor scores for the one or more phases of the modified travel plan;

determine a modified total weather factor score for the modified travel plan based on the weather factor scores for the one or more phases of the modified travel plan; and displaying the modified total weather factor score.

18. The computer program product of claim 17, wherein the computer-readable program code is further executable to replace the initial travel plan with the modified travel plan upon the modified total weather factor score being more favorable than the total weather factor score.

19. The computer program product of claim 17, wherein the computer-readable program code is further executable to receive at least one constraint, and wherein performing at least one modification to the initial travel plan comprises limiting modifications to the initial travel plan based on the at least one constraint.

20. The computer program product of claim 16, wherein the travel plan comprises a flight plan for an aircraft, and wherein the computer-readable program code is further executable to:

receive an aerodynamic model of the aircraft;

for each phase of the flight plan, calculate an aircraft stability difference between a baseline aircraft stability and an aircraft stability based on the received weather information and the received aerodynamic model; and generate a weather factor score based on the calculated aircraft stability difference.

21. The computer program product of claim 16, wherein the computer-readable program code is further executable to:

during execution of the travel plan:

receive updated weather information related to remaining one or more phases of the travel plan;

analyze the remaining one or more phases of the travel plan with respect to the received updated weather information to generate updated weather factor scores for the remaining one or more phases of the travel plan;

determine an updated total weather factor score for the travel plan based on the updated weather factor scores for the remaining one or more phases of the travel plan; and display the updated total weather factor score.

22. The computer program product of claim 21, wherein the computer-readable program code is further executable to:

perform at least one modification to the travel plan;

analyze the modified travel plan with respect to the received weather information to generate modified weather factor scores for the modified travel plan;

determine a modified total weather factor score for the remaining one or more phases of the modified travel plan based on the weather factor scores for the phases of the modified travel plan; and display the modified total weather factor score.

* * * * *